United States Patent
Howard, Jr. et al.

(10) Patent No.: US 11,878,637 B2
(45) Date of Patent: Jan. 23, 2024

(54) ATTACHMENT STRUCTURE FOR A VEHICLE ROOF LINING

(71) Applicant: Honda Motor Co., Ltd., Tokyo (JP)

(72) Inventors: John F. Howard, Jr., Marysville, OH (US); Akira Miyazaki, Birmingham, MI (US); Carlington G. Demetrius, Dublin, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 479 days.

(21) Appl. No.: 17/217,329

(22) Filed: Mar. 30, 2021

(65) Prior Publication Data

US 2022/0314903 A1 Oct. 6, 2022

(51) Int. Cl.
| | |
|---|---|
| *B60R 13/02* | (2006.01) |
| *B60R 21/232* | (2011.01) |
| *B60R 21/216* | (2011.01) |
| *B60R 21/231* | (2011.01) |
| *B60R 21/214* | (2011.01) |

(52) U.S. Cl.
CPC ........ *B60R 13/0212* (2013.01); *B60R 21/214* (2013.01); *B60R 21/216* (2013.01); *B60R 21/232* (2013.01); *B60R 21/23138* (2013.01); *B60R 2013/0287* (2013.01)

(58) Field of Classification Search
CPC ............ B60R 13/0206; B60R 13/0212; B60R 21/214; B60R 21/216; B60R 21/23138; B60R 21/232; B60R 2013/0287
See application file for complete search history.

(56) References Cited

U.S. PATENT DOCUMENTS

| | | | |
|---|---|---|---|
| 6,155,594 A | 12/2000 | Ibe et al. | |
| 6,155,596 A | 12/2000 | Nakajima et al. | |
| 6,431,585 B1 | 8/2002 | Rickabus et al. | |
| 7,025,377 B2 | 4/2006 | Ryu | |
| 7,410,189 B2 * | 8/2008 | Choi | B60R 21/213 280/730.2 |
| 7,654,558 B2 | 2/2010 | Choi | |
| 7,837,224 B2 * | 11/2010 | Benkler | B60R 21/213 280/730.2 |
| 8,480,120 B1 | 7/2013 | Fukuda et al. | |
| 2004/0075250 A1 * | 4/2004 | Choi | B60R 21/216 280/728.3 |

(Continued)

FOREIGN PATENT DOCUMENTS

| | | | |
|---|---|---|---|
| CN | 1230329 C | * 12/2005 | ......... B60R 13/0206 |
| CN | 101146700 B | * 12/2010 | ........... B60R 21/213 |

(Continued)

*Primary Examiner* — Lori Lyjak
(74) *Attorney, Agent, or Firm* — Mark E. Duell; RANKIN, HILL & CLARK LLP (57) ABSTRACT

An autonomous vehicle includes a vehicle body, a side curtain airbag mounted by the vehicle body, and a roof lining mounted to the vehicle body via an attachment structure. The attachment structure includes a bracket fastened to the vehicle body and the roof lining includes a mating hole aligned with the bracket. A cap at least partially received within the mating hole from an exterior surface of the roof lining is directly fastened to the bracket. A cover for covering the mating hole from the exterior surface of the roof lining is connected to the cap.

20 Claims, 7 Drawing Sheets

(56) References Cited

U.S. PATENT DOCUMENTS

| | | | |
|---|---|---|---|
| 2004/0169390 A1* | 9/2004 | Tiesler | B60R 11/02 |
| | | | 296/37.8 |
| 2005/0087961 A1 | 4/2005 | Lee | |
| 2005/0146163 A1* | 7/2005 | Martinez | B62D 25/06 |
| | | | 296/214 |
| 2007/0114766 A1 | 5/2007 | Hwang | |
| 2009/0064470 A1* | 3/2009 | Hosoya | B60R 13/0206 |
| | | | 24/458 |
| 2016/0167614 A1* | 6/2016 | Inami | B60R 21/216 |
| | | | 280/730.2 |

FOREIGN PATENT DOCUMENTS

| | | | |
|---|---|---|---|
| CN | 204222769 | 3/2015 | |
| CN | 104670146 A * | 6/2015 | B60R 21/213 |
| EP | 3178703 A1 * | 6/2017 | |
| JP | 2002144975 A * | 5/2002 | |
| JP | 3649035 | 5/2005 | |
| JP | 4230018 | 2/2009 | |
| JP | 5277794 | 8/2013 | |
| JP | 5856044 | 2/2016 | |
| KR | 100552053 | 2/2006 | |
| KR | 20100060540 | 6/2010 | |
| KR | 20120039122 A * | 4/2012 | |
| KR | 20190111322 | 10/2019 | |
| WO | WO-0123222 A1 * | 4/2001 | B60R 13/0212 |
| WO | WO-2012150634 A1 * | 11/2012 | B60R 13/0206 |

* cited by examiner

ATTACHMENT STRUCTURE FOR A VEHICLE ROOF LINING

BACKGROUND

It is known to dispose a side curtain airbag along a roof side rail of a vehicle, wherein the side curtain airbag is deployed in response to a crash event so as to spread out along a side surface within a passenger compartment of the vehicle. The side curtain airbag is generally installed within an interior trim member provided by a roof lining, and deployment of the side curtain airbag is through a pathway generally formed between the trim member and the roof lining. In a conventional structure, during deployment the roof lining can deform and/or detach from the vehicle body. Typically, to prevent this defamation and/or detachment a roof mounted grab rail is provided, which additionally secures the roof lining to a vehicle body. However, for an autonomous shared vehicle with a single side door opening the grab rail is moved to a center area of the side door opening thereby preventing the use of the grab rail as an additional attachment structure for the roof lining.

BRIEF DESCRIPTION

According to one aspect, an autonomous vehicle comprises a vehicle body, a side curtain airbag mounted by the vehicle body, and a roof lining mounted to the vehicle body via an attachment structure. The attachment structure includes a bracket fastened to the vehicle body and the roof lining includes a mating hole aligned with the bracket. A cap at least partially received within the mating hole from an exterior surface of the roof lining is directly fastened to the bracket. A cover for covering the mating hole from the exterior surface of the roof lining is connected to the cap.

According to another aspect, an autonomous vehicle comprises a vehicle body, a side curtain airbag mounted by the vehicle body, and a roof lining mounted to the vehicle body. The roof lining is defined by front and rear roof lining elements relative to a front-rear direction of the vehicle and a separate center roof lining element secured to the front and rear roof lining elements. Front and rear brackets fasten the center roof lining element to the vehicle body. The front and rear brackets are aligned with front and rear mating holes extended through the center roof lining element. Front and rear caps are at least partially received in the respective front and rear mating holes from an exterior surface of the roof lining. The front and rear caps are directly fastened to the respective front and rear brackets, wherein front and rear portions of the center roof lining element are captured between the respective front and rear brackets and the respective front and rear caps fastened thereto.

According to another aspect, an autonomous vehicle comprises a vehicle body, a side curtain airbag mounted by the vehicle body, and a roof lining mounted to the vehicle body. The roof lining includes front and rear roof lining elements relative to a front-rear direction and a separate center roof lining element. The front and rear roof lining elements are mounted to the vehicle body. The center roof lining element is mounted directly to the front and rear roof lining elements. Front and rear brackets fasten the center roof lining element to the vehicle body. The front and rear brackets are aligned with front and rear mating holes extended through the center roof lining element. Each of the front and rear bracket includes a base and at least one arm extended from the base. The base overlays an inner surface of the center roof lining element at the respective front and rear mating hole. The at least one arm is fastened to the vehicle body. Front and rear caps are at least partially received in the respective front and rear mating holes from an exterior surface of the roof lining. The front and rear caps are directly fastened to the bases of the respective front and rear brackets. A front cover is connected to the front cap for covering the front mating hole from the exterior surface of the roof lining, and a rear cover is connected to the rear cap for covering the rear mating hole from the exterior surface of the roof lining.

DETAILED DESCRIPTION

It should, of course, be understood that the description and drawings herein are merely illustrative and that various modifications and changes can be made in the structures disclosed without departing from the present disclosure. The drawing figures are not necessarily drawn to scale and certain figures may be shown in exaggerated or generalized form in the interest of clarity and conciseness.

Figure 1:
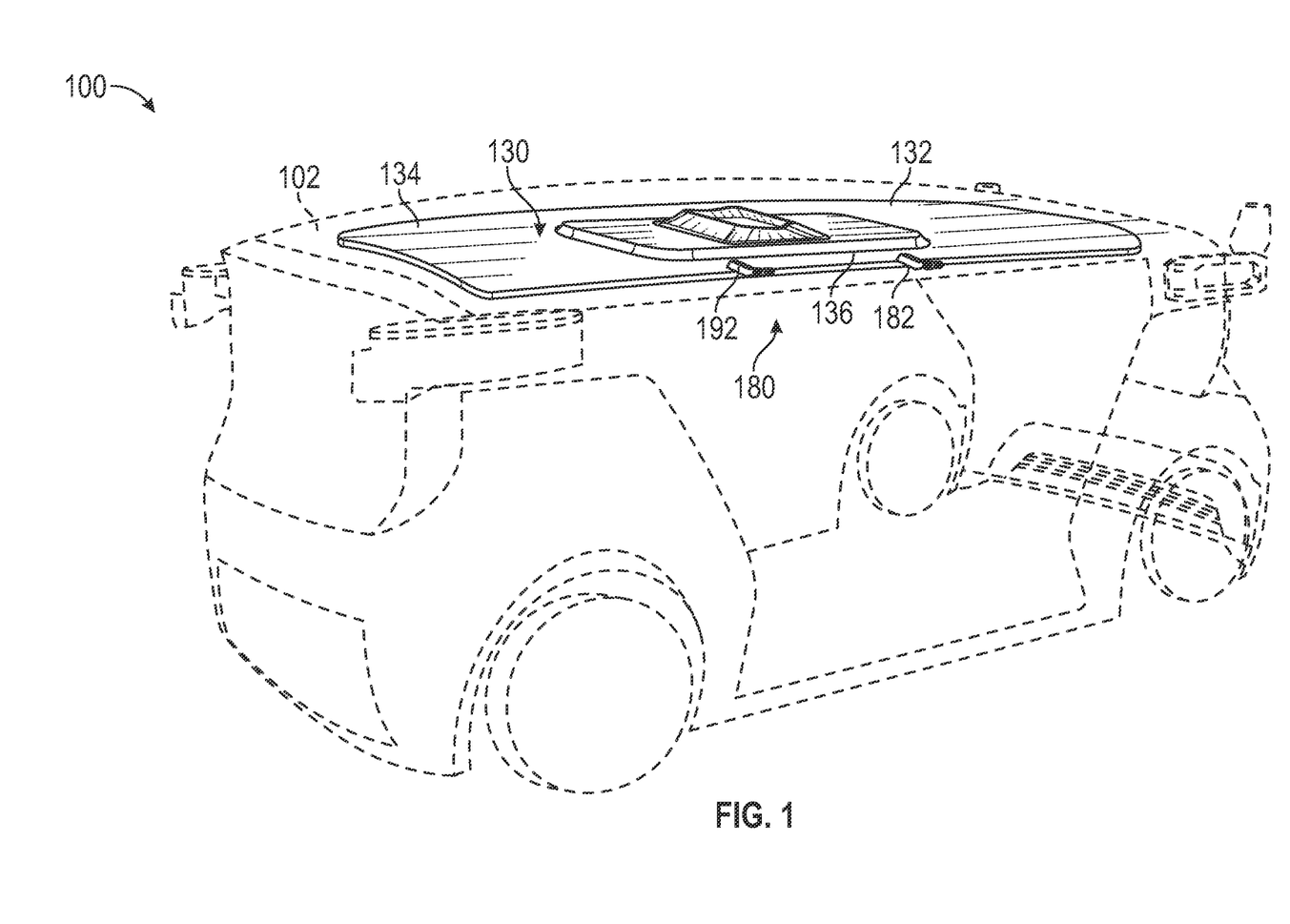
FIG. 1 is a schematic side perspective view of an interior structure for an autonomous vehicle according to the present disclosure including a split roof lining and attachment structures for mounting the split roof lining to a vehicle body.
Figure 2:
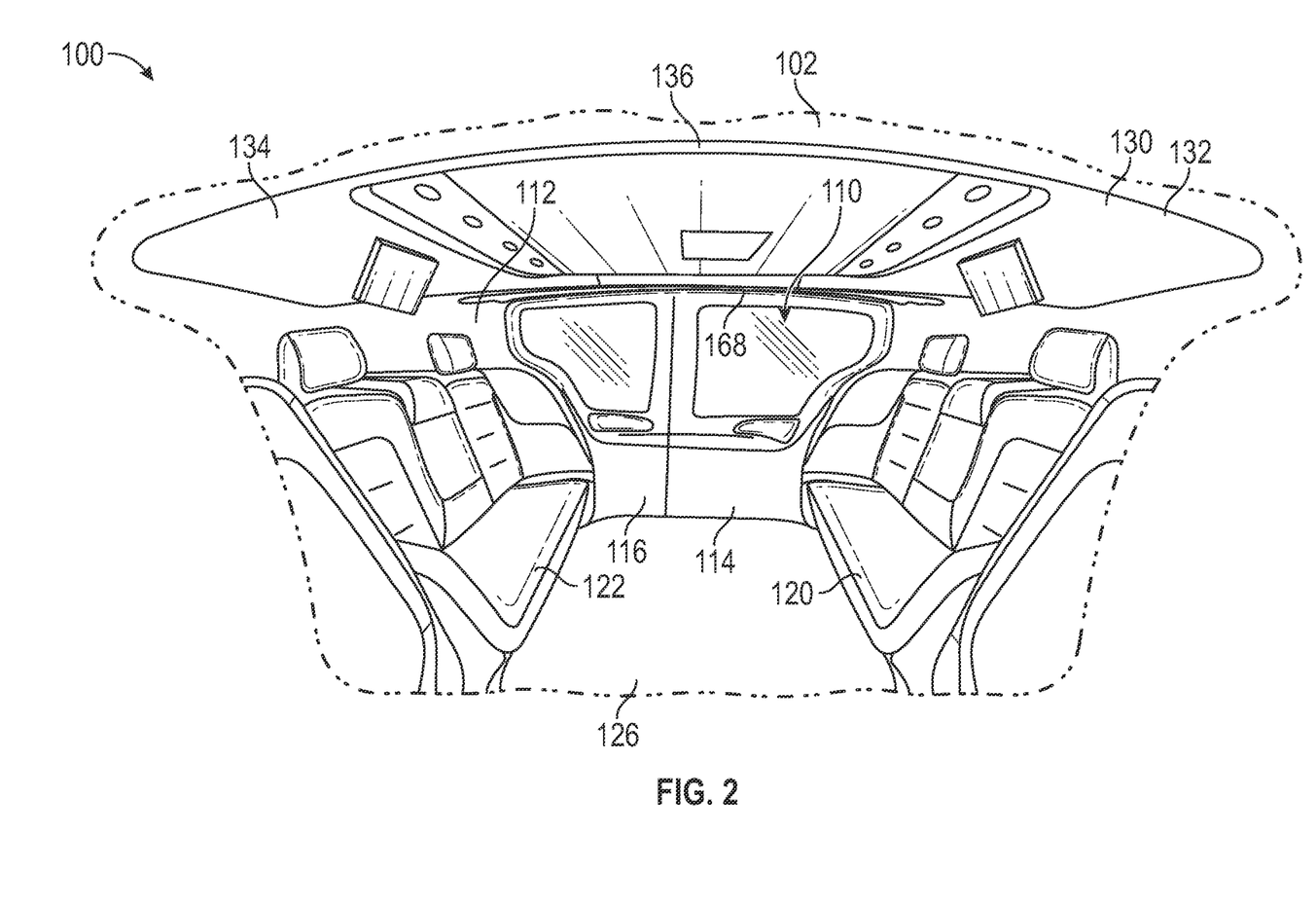
FIG. 2 is a perspective view of an interior of the vehicle of FIG. 1 showing the split roof lining.

Referring now to the drawings, wherein like numerals refer to like parts throughout the several views, FIGS. 1 and 2 schematically illustrate an autonomously-driven vehicle 100 comprising a vehicle body 102. In this example embodiment, the term "vehicle body" is used generically, and should be interpreted to include structural components of the vehicle 100, such as a body frame, a roof structure, a floor structure, a door(s), exterior panels, interior panels, and the like. The vehicle body 102 extends in a front-rear (longitudinal) direction, a left-right (width) direction, and an up-down (height or vertical) direction of the vehicle 100. The autonomous vehicle 100 is configured such that each side of the vehicle body 102 defines a single door opening which is closed by a pair of sliding doors. By way of example, FIG. 2 depicts a door opening 110 on one side 112 of the vehicle body that is closed by sliding doors 114, 116. Further depicted are a front seat assembly 120, a rear seat assembly 122, the seat assemblies 120, 122 mounted to the floor structure 126 and facing one another, and a split roof liner or roof lining 130 mounted to the vehicle body 102.

Figure 3:
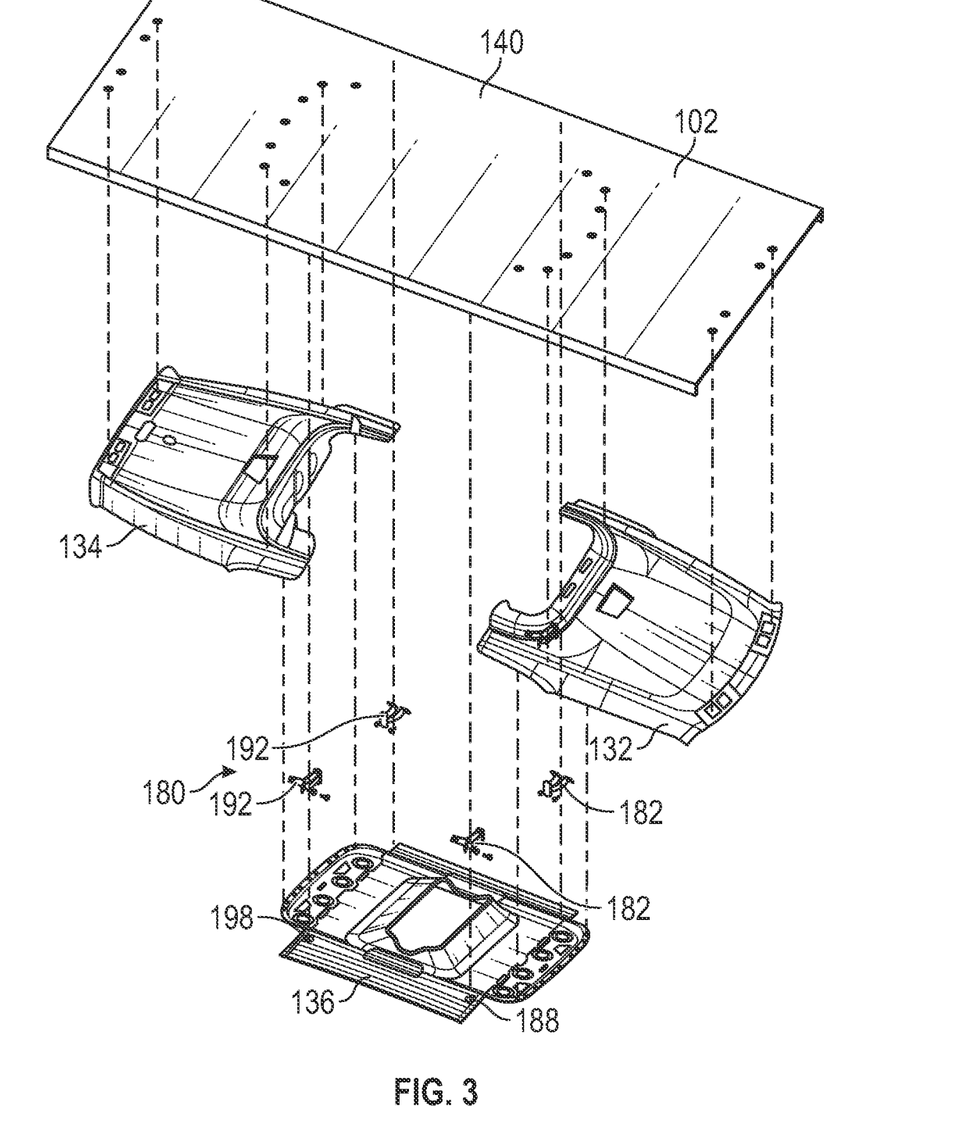
FIG. 3 is a perspective view of an installation of the split roof lining to parts of the vehicle body.
Figure 4:
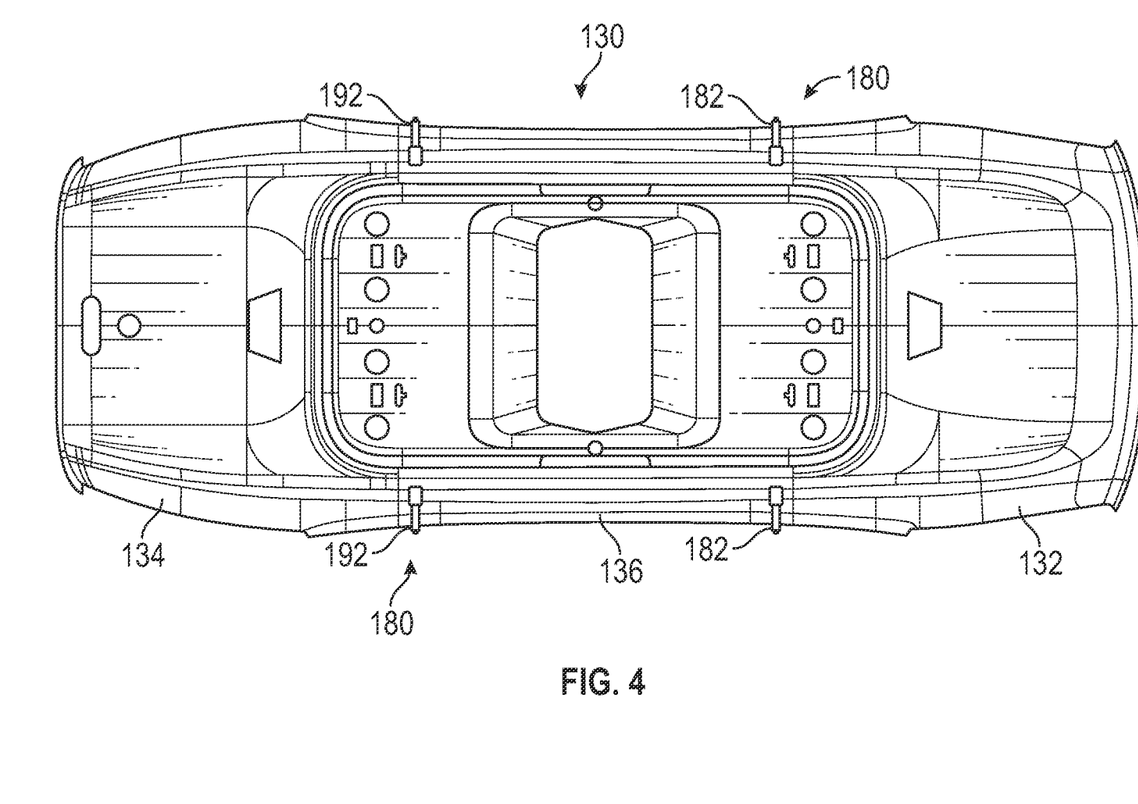
FIG. 4 is a top view of the assembled split roof lining with the attachment structures of the present disclosure.

With reference to FIGS. 3 and 4, the roof lining 130 is defined by a front roof lining element 132 and a rear roof lining element 134 relative to the front-rear direction of the vehicle 100 and a separate center roof lining element 136 secured to the front and rear roof lining elements 132, 134. The roof lining 130 is configured to connect to a roof installation 140 provided as part of the vehicle body 102. The roof installation 140 is not particularly limited, and may include a roof frame member of the vehicle body, a roof panel, or other component of the roof structure of the vehicle body 102. When connected to the roof installation 140, the front roof lining element 132 is arranged at a front of the vehicle 100, the rear roof lining element 134 is arranged at a rear of the vehicle 100 and may not contact the front roof lining element 132, and the center roof lining element 136 is arranged between the front and rear roof lining elements 132 and 134 and fills a gap therebetween. Referring back to FIG. 2, the center roof lining element 136 substantially spans an entire length dimension of the door opening 110.

In a non-limiting embodiment, the front and rear roof lining elements 132 and 134 are configured to connect to the roof installation 140, either directly to the roof installation or indirectly to the roof installation via an intervening element. As used herein, "directly connects" or cognate terms/phrases means that the two referenced elements are connected to each other with no intervening elements arranged between them, and "indirectly connects" or cognate terms/phrases means that the two referenced elements are connected to each other with one or more intervening elements arranged between them. The center roof lining element 136 is configured to directly connect to the front and rear roof lining elements 132 and 134 and thus only indirectly connect to the roof installation 140 by directly connecting to the front and rear roof lining elements 132 and 134, which themselves are directly connected to the roof installation 140.

Figure 5:
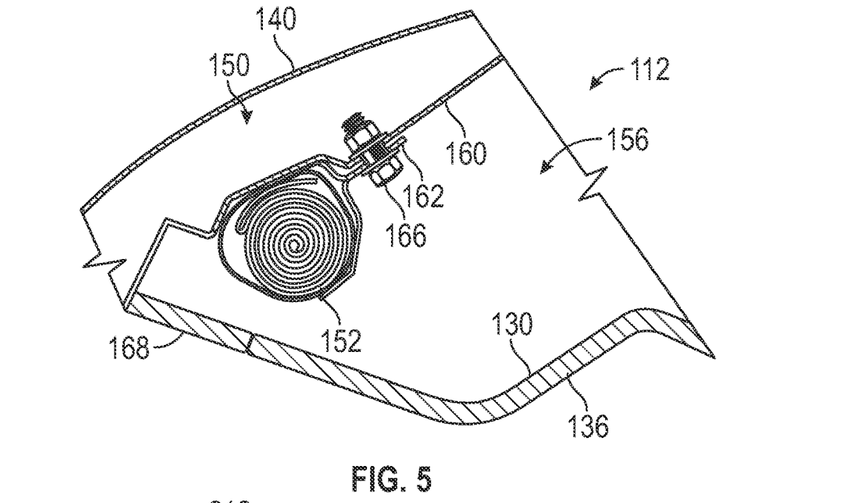
FIG. 5 is a partial cross-sectional view of FIG. 2.

The vehicle 100 is further provided with an occupant protection device 150. FIG. 5 is a schematic cross-sectional view of the vehicle body side 112 taken through the center roof lining element 136. In FIG. 5 the occupant protection device 150 is a side curtain airbag 152 stored in a roof space 156, wherein the side curtain airbag is sized to extend along the vehicle body side 112 over the door opening 110. As is known in the art, the side curtain airbag 152 is deployed in response to a crash event so as to spread out along the vehicle body side 112 within a passenger compartment inside of the doors 114, 116. The side curtain airbag 152 is mounted to the vehicle body, specifically a roof side rail 160 of the roof installation 140, by mounting brackets 162 fastened (for example, by a bolt 166) to and arranged along the roof side rail at predetermined intervals. As shown, the roof space 156 is a space formed between the roof side rail 160, the center roof lining element 136 of the roof lining 130 and a door trim 168 located outboard of the roof lining relative to the width direction. In FIG. 2, the door trim 168 spans the entire length of the center roof lining with opposite end portions interfaced with the front and rear roof lining elements 132 and 134.

Figure 6:
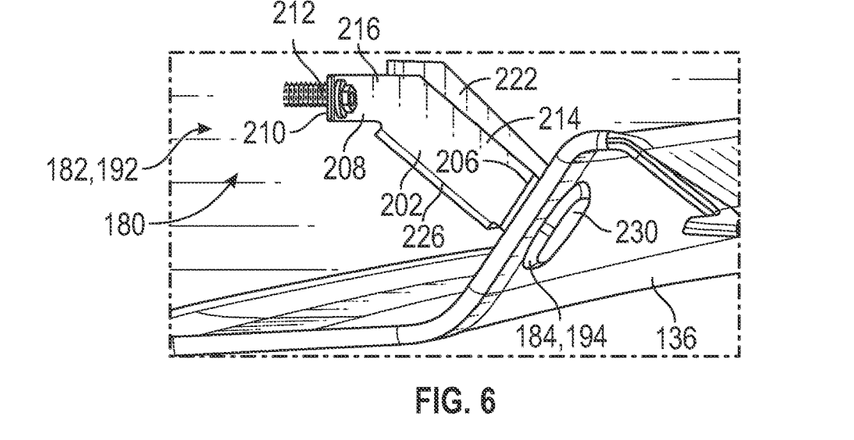
FIG. 6 is a partial side perspective view of one of the attachment structures for a center roof lining element of the split roof lining according to one aspect of the present disclosure.
Figure 7:
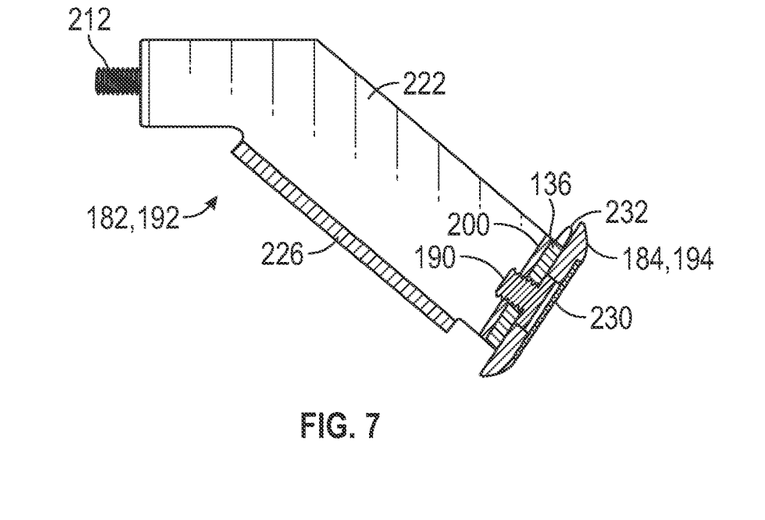
FIG. 7 a partial cross-sectional view of FIG. 6.

As indicated previously, the center roof lining element 136 is configured to directly connect to the front and rear roof lining elements 132 and 134 and thus only indirectly connect to the roof installation 140. Therefore, according to the present disclosure, to prevent defamation of the center roof lining element 136 and/or detachment of the center roof lining element from the vehicle body 102 during deployment of the side curtain airbag 152, a separate attachment structure 180 for the center roof lining element 136 of the roof lining is provided. As shown in FIGS. 6 and 7, the attachment structure 180 is in the form of a bracket 182 adapted to separately secure the center roof lining element 136 to the vehicle body 102. In the depicted embodiment, the bracket 182 is directly connected or fastened to the vehicle body 102 and indirectly connected or fastened to the center roof lining element 136 via a cap 184 directly connected or fastened to the bracket 182 from an exterior surface of the center roof lining element 136. The cap 184 at least partially covers a mating hole 188 formed in the center roof lining element 136 (see FIG. 3), which allows for the use of a fastener (for example, a bolt 190) to directly fasten the cap 184 to the bracket 182. Further, the bracket 182 is a front bracket located at a front connection area between the front roof lining element 132 and the center roof lining element 136 that fastens the roof lining to the vehicle body at a forward part of the door opening 110, and a separate rear bracket 192 is located at a rear connection area between the rear roof lining element 134 and the center roof lining element 136 that fastens the roof lining to the vehicle body at a rear part of the door opening 110. A rear cap 194 directly fastened to the rear bracket 192 from the exterior surface of the center roof lining element 136 at least partially covers a rear mating hole 198 formed in the center roof lining element (see FIG. 3), which allows for the use of a fastener (for example, another bolt 190) to directly fasten the rear cap 194 to the rear bracket 192.

Each of the front and rear brackets 182, 192 is similarly constructed but for their disposition along the side of the center roof lining element 136. Therefore, in FIGS. 6 and 7, each of the front and rear brackets 182, 192 includes a base 200 and at least one arm 202 extended from the base. The at least one arm 202 includes a first end 206 secured to the base and a second end 208 remote from the base for direct connection to the vehicle body 102. The second end 208 can include a tab 210 for a fastener (for example, bolt 212). The at least one arm 202 further includes a first section 214 having the first end, the first section extended from the base 200, and a second section 216 having the second end, the second section extended angularly from the first section. In the depicted embodiment, the at least one arm 202 is a first arm and each of the front and rear brackets 182, 192 includes a second arm 222 extended from the base, the second arm constructed similar to the first arm 202, the second arm directly connected or fastened to the vehicle body 102. A stiffening plate 226 can interconnect the first and second arms 202, 222 of each bracket 182, 192 to provide strength and rigidity to each bracket 182, 192.

In assembly, the front and rear brackets 182, 192 together with the front and rear caps 184, 194 are fastened to the center roof lining element 136, specifically a raised section of the center roof lining element 136 relative to a height direction of the vehicle in a side view of the roof lining (see FIG. 6). The base 200 of each of the front and rear brackets 182, 192 overlays an inner surface of the center roof lining element 136 and at least partially covers the respective mating hole 188, 198 from the inner surface. Each front and rear cap 184, 194 at least partially covers the respective mating hole 188, 198 from the exterior surface of the center roof lining element 136, and is directly connected or fastened to the base 200 via the bolts 190. Each cap 184, 194 can include a cover 230 to cover the bolt 190 from the inside of the vehicle. Further, to prevent each cover 230 from separating from the roof lining 130 during deployment of the side curtain airbag 152, each cover is tethered via a tether or line 232 to one of the bracket 182, 192 and the cap 184, 194.

Figure 8:
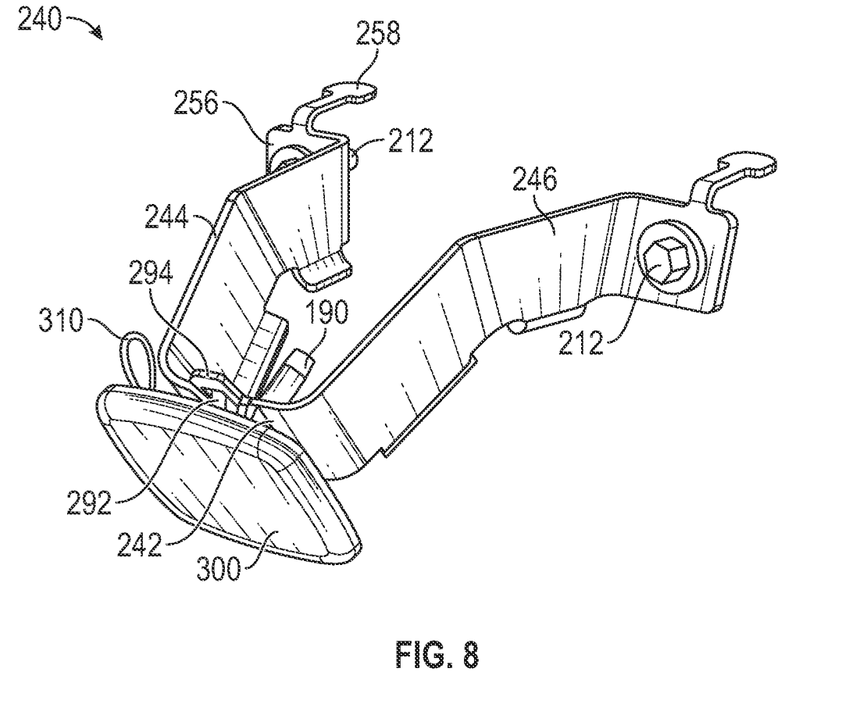
FIGS. 8 and 9 are perspective views of one of the attachment structures for the center roof lining element according to another aspect of the present disclosure.
Figure 9:
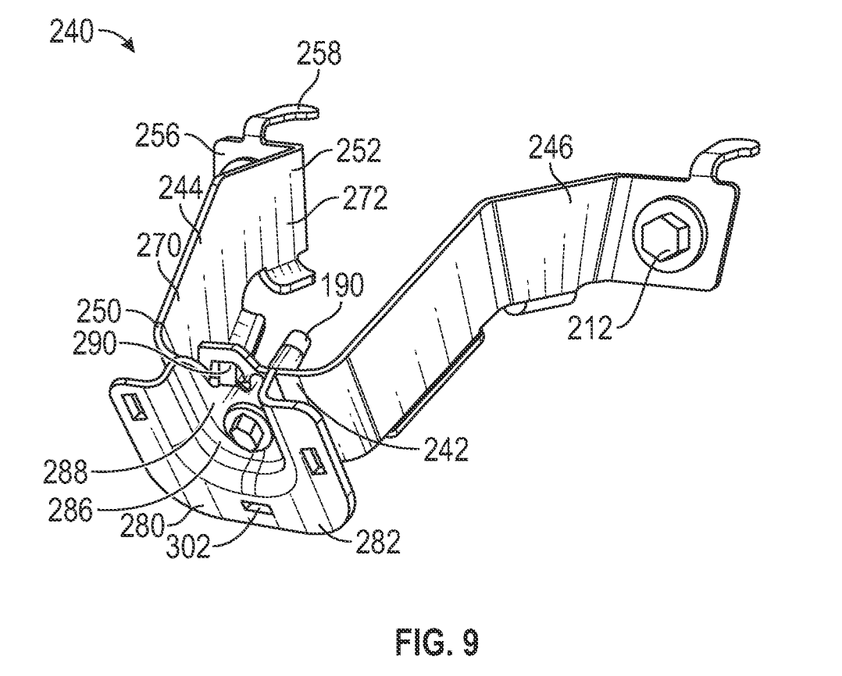

FIGS. 8 and 9 depict the attachment structure 180 in the form of a bracket 240 according to another aspect of the present disclosure. The bracket 240 can be provided as at least one of the front bracket and the rear bracket to separately secure the center roof lining element 136 to the vehicle body 102. Similar in construction to the front and rear brackets 182, 192 described above, the bracket 240 includes a base 242 and first and second arms 244, 246 extended from the base. The first arm 244 includes a first end 250 secured to the base and a second end 252 remote from the base for direct connection to the vehicle body 102. The second end 252 can include a tab 256 for a fastener (for example, bolt 212). The tab 256 can be provided with a mounting finger 258 to be received in an opening in the vehicle body 102 to properly locate the bracket 240 for attachment via the bolt 212. The first arm 202 further includes a first section 270 having the first end, the first section extended from the base 242, and a second section 272 having the second end, the second section extended angularly from the first section. In the depicted embodiment, the second arm 246 is constructed similar to the first arm 202, the second arm directly connected or fastened to the vehicle body 102 via another bolt 212.

Figure 10:
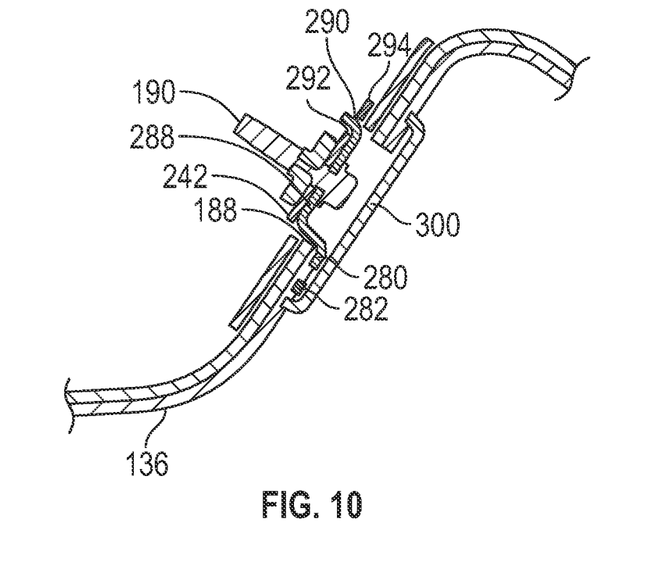
FIGS. 10 and 11 are partial cross-sectional view of the center roof lining element with the attachment structure of FIG. 8 mounted thereto.
Figure 11:
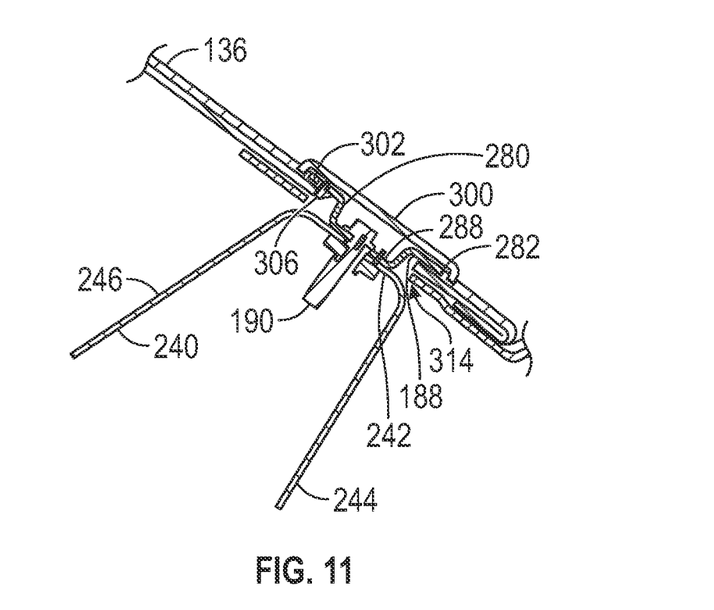

In FIGS. 10 and 11, the bracket 240 is directly connected or fastened to the vehicle body 102 and indirectly connected or fastened to the center roof lining element 136 via a cap 280 directly connected to the base 242 of the bracket 182. In the depicted aspect, the cap 280 is at least partially received in the mating hole (for example, the front mating hole 188) formed in the center roof lining element 136, which allows for the use of a fastener (for example, another bolt 190) to directly fasten the cap 280 to the bracket 182. Referring back to FIGS. 8 and 9, the cap 280 includes an outer flange 282 and a recessed section 284 at least partially surrounded by the outer flange 282 (noting that the outer flange is U-shaped in a front view of the cap 280). The recessed section includes a sidewall 286 extended from the outer flange and a base wall 288 to be directly fastened to the base 242 of the bracket 240. To temporary hold the cap 280 to the bracket 240 prior to the cap being fastened to the bracket, a locating tab 290 can project from the base wall 288 for receipt in an opening 292 of an extension 294 of the base 242 of the bracket 240. A cover 300 for covering the mating hole 188 from the exterior surface of the roof lining is connected to the cap 280, specifically the outer flange 282. As shown, the outer flange 282 includes holes 302 for receiving mounting tabs 306 provided on the cover 300; although, alternative means for connecting the cover to the cap are contemplated. Further, to prevent the cover 300 from separating from the roof lining 130 during deployment of the side curtain airbag 152, the cover 300 is tethered via a tether or line 310 to the cap 280.

With reference again to FIGS. 10 and 11, in assembly the bracket 240 together with the cap 280 are fastened to the center roof lining element 136. The base 242 of the bracket 240 overlays the inner surface of the center roof lining element 136 and covers the mating hole 188, 198 from the inner surface. The cap 280 is at least partially received in the mating hole 188, the base wall 288 engaging the base 242. The outer flange 282 of the cap 280 engages the exterior surface of the center roof lining element 136, and with the base wall 288 spaced from the outer flange 282 the outer flange and the bracket 240 define a receiving space 314 for a portion of the center roof lining element 136, that portion being captured between the bracket 240 and the cap 280 fastened thereto. The cover 300 covers the mating hole 188, and in turn the bolt 190, from the exterior surface of the center roof lining element 136, and is directly connected to the outer flange 282.

Accordingly, the autonomous vehicle 100 comprises the vehicle body 102, the side curtain airbag 152 mounted by the vehicle body, and the roof lining 130 mounted to the vehicle body. The roof lining 130 is defined by the front and rear roof lining elements 132, 134 relative to a front-rear direction of the vehicle and the separate center roof lining element 136 secured to the front and rear roof lining elements. The brackets 182, 192, 240 fasten the center roof lining element 136 to the vehicle body to prevent deformation and/or detachment of the center roof lining element 136 during deployment of the side curtain airbag 152. The brackets 182, 192, 240 are aligned with mating holes 188, 198 extended through the center roof lining element. The caps 184, 194, 280 are directly fastened to the respective brackets. In this manner, the spaced brackets 182, 192, 240 on each side of the center roof lining element 136 define four points of direct connection of the center roof lining element 136 with the vehicle body 102, wherein a longitudinal span of the roof lining between the front and rear brackets is devoid of another point of direct connection with the vehicle body to avoid interference with deployment of the side curtain airbag 152 (see FIG. 4). Further, the covers 230, 300 can be tethered to one of the brackets and the caps, the covers covering the mating hole 188, 198 from the exterior surface of the roof lining.

It will be appreciated that the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. An autonomous vehicle comprising:
   a vehicle body;
   a side curtain airbag mounted by the vehicle body;
   a roof lining mounted to the vehicle body via an attachment structure, wherein the attachment structure includes a bracket fastened to the vehicle body and the roof lining includes a mating hole aligned with the bracket;
   a cap at least partially received within the mating hole from an exterior surface of the roof lining is directly fastened to the bracket; and
   a cover for covering the mating hole from the exterior surface of the roof lining is connected to the cap.

2. The autonomous vehicle of claim 1, wherein the roof lining includes front and rear roof lining elements relative to a front-rear direction of the vehicle secured to a separate center roof lining element.

3. The autonomous vehicle of claim 2, wherein the bracket together with the cap secure the center roof lining element to the vehicle body.

4. The autonomous vehicle of claim 3, wherein the bracket is a front bracket located at a front connection area between the front roof lining element and the center roof lining element, and including a rear bracket located at a rear connection area between the rear roof lining element and the center roof lining element.

5. The autonomous vehicle of claim 1, wherein the cap includes an outer flange engaging the exterior surface of the roof lining.

6. The autonomous vehicle of claim 5, wherein the cap includes a recessed section having a base wall directly fastened to the bracket, the base wall spaced from the outer flange so that the outer flange and the bracket define a receiving space for a portion of the roof lining.

7. The autonomous vehicle of claim 1, wherein the bracket includes a base and at least one arm extended from the base, the base overlaying an inner surface of the roof lining at the mating hole, the at least one arm fastened to the vehicle body, the cap directly fastened to the base.

8. The autonomous vehicle of claim 7, wherein the at least one arm is a first arm and the bracket includes a second arm extended from the base, the second arm fastened to the vehicle body.

9. The autonomous vehicle of claim 1, wherein a side of the vehicle body defines a single door opening, and the bracket and the cap are a front bracket and a front cap relative to a front-rear direction of the vehicle that together fasten the roof lining to the vehicle body at a forward part of the door opening.

10. The autonomous vehicle of claim 9, including a rear bracket and a rear cap that together fasten the roof lining to the vehicle body at a rear part of the door opening.

11. The autonomous vehicle of claim 10, wherein the front and rear brackets together with the front and rear caps define four points of direct connection of the center roof lining element with the vehicle body, wherein a longitudinal span of the roof lining between the front and rear brackets is devoid of another point of direct connection with the vehicle body.

12. An autonomous vehicle comprising:
a vehicle body;
a side curtain airbag mounted by the vehicle body;
a roof lining mounted to the vehicle body, the roof lining defined by front and rear roof lining elements relative to a front-rear direction of the vehicle and a separate center roof lining element secured to the front and rear roof lining elements;
front and rear brackets for fastening the center roof lining element to the vehicle body, wherein the front and rear brackets are aligned with front and rear mating holes extended through the center roof lining element; and
front and rear caps at least partially received in the respective front and rear mating holes from an exterior surface of the roof lining, the front and rear caps directly fastened to the respective front and rear brackets,
wherein front and rear portions of the center roof lining element are captured between the respective front and rear brackets and the respective front and rear caps fastened thereto.

13. The autonomous vehicle of claim 12, further including a front cover connected to the front cap for covering the front mating hole from the exterior surface of the roof lining, and a rear cover connected to the rear cap for covering the rear mating hole from the exterior surface of the roof lining.

14. The autonomous vehicle of claim 13, wherein each of the front and rear caps includes an outer flange provided over the exterior surface of the roof lining, each of the front and rear covers connected to the respective outer flange of each of the front and rear caps.

15. The autonomous vehicle of claim 12, wherein each of the front and rear brackets includes a base and at least one arm extended from the base, the base overlaying an inner surface of the center roof lining element at the respective front and rear mating holes, the at least one arm fastened to the vehicle body,
wherein each of the front and rear caps is directly fastened to the respective base of each of the front and rear brackets.

16. The autonomous vehicle of claim 15, wherein the at least one arm is a first arm and each of the front and rear brackets includes a second arm extended from the base, the second arm fastened to the vehicle body.

17. An autonomous vehicle comprising:
a vehicle body;
a side curtain airbag mounted by the vehicle body;
a roof lining including front and rear roof lining elements relative to a front-rear direction and a separate center roof lining element, the front and rear roof lining elements mounted to the vehicle body, the center roof lining element mounted directly to the front and rear roof lining elements;
front and rear brackets for fastening the center roof lining element to the vehicle body, wherein the front and rear brackets are aligned with front and rear mating holes extended through the center roof lining element, wherein each of the front and rear bracket includes a base and at least one arm extended from the base, the base overlaying an inner surface of the center roof lining element at the respective front and rear mating holes, the at least one arm fastened to the vehicle body;
front and rear caps at least partially received in the respective front and rear mating holes from an exterior surface of the roof lining, the front and rear caps directly fastened to the bases of the respective front and rear brackets; and
a front cover connected to the front cap for covering the front mating hole from the exterior surface of the roof lining, and a rear cover connected to the rear cap for covering the rear mating hole from the exterior surface of the roof lining.

18. The autonomous vehicle of claim 17, wherein each of the front and rear caps includes an outer flange provided over the exterior surface of the roof lining, each of the front and rear covers connected to the respective outer flange of each of the front and rear caps.

19. The autonomous vehicle of claim 17, wherein each of the front and rear covers is tethered to each of the respective front and rear caps.

20. The autonomous vehicle of claim 17, wherein the at least one arm is a first arm and each of the front and rear bracket includes a second arm extended from the base, the second arm fastened to the vehicle body.

* * * * *